United States Patent [19]

Seo et al.

[11] Patent Number: 5,555,059
[45] Date of Patent: Sep. 10, 1996

[54] ELECTROMAGNETIC LENS SHUTTER APPARATUS

[75] Inventors: Jae-kyeong Seo; Deog-ho Choi; Seon-ho Lee, all of Changwon-si, Rep. of Korea

[73] Assignee: Samsung Aerospace Industries, Ltd., Kyeongsangnam-Do, Rep. of Korea

[21] Appl. No.: 195,665

[22] Filed: Feb. 14, 1994

Related U.S. Application Data

[63] Continuation-in-part of Ser. No. 3,494, Jan. 12, 1993, abandoned.

[30] Foreign Application Priority Data

Nov. 10, 1992 [KR]  Rep. of Korea .................. 92-21057

[51] Int. Cl.⁶ ................................................. G03B 9/08
[52] U.S. Cl. ............................................... 354/234.1
[58] Field of Search ........................... 354/231.1, 400, 354/435; 310/49 R, 156

[56] References Cited

U.S. PATENT DOCUMENTS

| | | | |
|---|---|---|---|
| 3,971,963 | 7/1976 | Koike et al. | 310/154 |
| 4,237,396 | 12/1980 | Blenkinsop et al. | 310/154 |
| 4,315,171 | 2/1982 | Schaeffer | 310/49 R |
| 4,426,145 | 1/1984 | Hashimoto | 354/195.1 |
| 4,561,744 | 12/1985 | Reitbrock et al. | 354/234.1 |
| 4,623,233 | 11/1986 | Yamada | 354/229 |
| 4,733,261 | 3/1988 | Gunshi et al. | 354/400 |
| 4,922,145 | 5/1990 | Shtipelman | 310/49 R |
| 5,111,230 | 5/1992 | Kobayashi | 391/400 |
| 5,413,010 | 5/1995 | Nakanishi et al. | 310/156 |
| 5,418,588 | 5/1995 | Chigira | 354/234.1 |

FOREIGN PATENT DOCUMENTS

| | | |
|---|---|---|
| 2346386 | 3/1974 | Germany . |
| 2801383 | 7/1979 | Germany . |
| 3229745 | 2/1983 | Germany . |
| 3346769 | 6/1984 | Germany . |
| 2012441 | 7/1979 | United Kingdom . |

*Primary Examiner*—Michael L. Gellner
*Assistant Examiner*—Nicholas J. Tuccillo
*Attorney, Agent, or Firm*—McAulay Fisher Nissen Goldberg & Kiel, LLP

[57] ABSTRACT

Disclosed is an electromagnetic lens shutter apparatus of simple construction which can be applied to a camera having an automatic exposure control function and an automatic focus control function. The electromagnetic lens shutter apparatus comprises a lens mount; at least two sheet-like lens shutter blades; an exposure adjustment ring; opening means for opening and closing the shutter blades; and a central processing unit to control the rotation of a linear pulse motor. The linear pulse motor includes a circular rotor mounted around the cylindrical portion and a plurality of stators placed around the rotor, each stator has two armatures mounted on an inner circumference thereof with a predetermined distance from the rotor. The rotor has a plurality of projections on the outer circumference thereof projected radially outwardly at regular intervals. A permanent magnet is provided between the stators.

4 Claims, 9 Drawing Sheets

ELECTROMAGNETIC LENS SHUTTER APPARATUS

This application is a continuation-in-part of U.S. application Ser. No. 08/003,494, filed Jan. 12, 1993, now abandoned.

BACKGROUND OF THE INVENTION

1. Field of the Invention

The present invention relates to an electromagnetic lens shutter apparatus for a camera. More particularly, this invention relates to an electromagnetic lens shutter apparatus in which lens shutter blades are operated electromagnetically.

2. Description of the Prior Art

Generally, the opening and closing functions of shutter blades are carried out by controlling a direction and a time of an electrical current which flows through an electromagnet in an electromagnetic shutter apparatus. Such an electromagnetic shutter apparatus has a simple construction compared with a mechanical shutter which uses a mechanical spring force to effect the opening and closing functions of shutter blades.

U.S. Pat. No. 4,881,093 discloses an electromagnetically operated shutter assembly for a camera which includes permanent magnets which are affixed to shutter blades. An electromagnetic field is generated by a number of armatures which interact with the permanent magnets to cause the shutter blades to move between open and closed positions. The configurations of the permanent magnets and armatures permit the blades to be held in the open and closed positions without the further application of current to the armatures. Also, the permanent magnets are levitated by the electromagnetic field in order to facilitate movement of the shutter blades between the opening and closing positions. However, such a shutter cannot be applied to an automatic focusing and exposure camera.

Japanese Patent Publication No. 90-33130 describes an electromagnetically operated shutter mechanism in which a first moving coil member for moving a shutter blade between an affixed permanent magnet and a yoke at an opposing position of the permanent magnet and a second moving coil member for deciding an open degree of the shutter blade are provided. An operation of both moving coil members is carried out at a predetermined time difference, so that an automatic exposure is effected. However, since the shutter in this manner does not have an automatic focusing function, it is applied only to a simple fixed focus camera and cannot be applied to a zoom camera commonly used at the present time.

SUMMARY OF THE INVENTION

It is an object of the invention to provide an electromagnetic lens shutter apparatus which has a compact construction and which can be applied to an automatic exposure and focus control camera or automatic exposure control camera to overcome the disadvantages of the prior art described above.

It is another object of the invention to provide a simplified structure for actuating a shutter in an automatic camera.

The invention provides an electromagnetic lens shutter apparatus which comprises: a lens mount including a hollow cylindrical portion defining an opening and a flange fixed on the cylindrical portion; at least two sheet-like lens shutter blades rotatably mounted on a side surface of the flange opposite to the cylindrical portion; an exposure adjustment ring rotatably mounted on the cylindrical portion and including an exposure adjustment cam; a linear pulse motor for driving the exposure adjustment ring, the linear pulse motor including a circular rotor rotatably mounted around the cylindrical portion and a plurality of stator placed around the rotor, each stators having two armatures mounted on an inner circumference thereof with a predetermined distance from the rotor, the rotor having a plurality of projections on an outer circumference thereof projected radially outwardly at regular intervals, and a permanent magnet provided between the stators; opening means for opening and closing the shutter blades in accordance with the operation of the exposure adjustment cam; and a central processing unit to control the rotation of the linear pulse motor.

BRIEF DESCRIPTION OF THE DRAWINGS

These and other embodiments and features of the present invention will become more readily apparent upon reading the following detailed description in conjunction with the attached drawings, in which.

DESCRIPTION OF THE PREFERRED EMBODIMENT

Figures 1, 2:
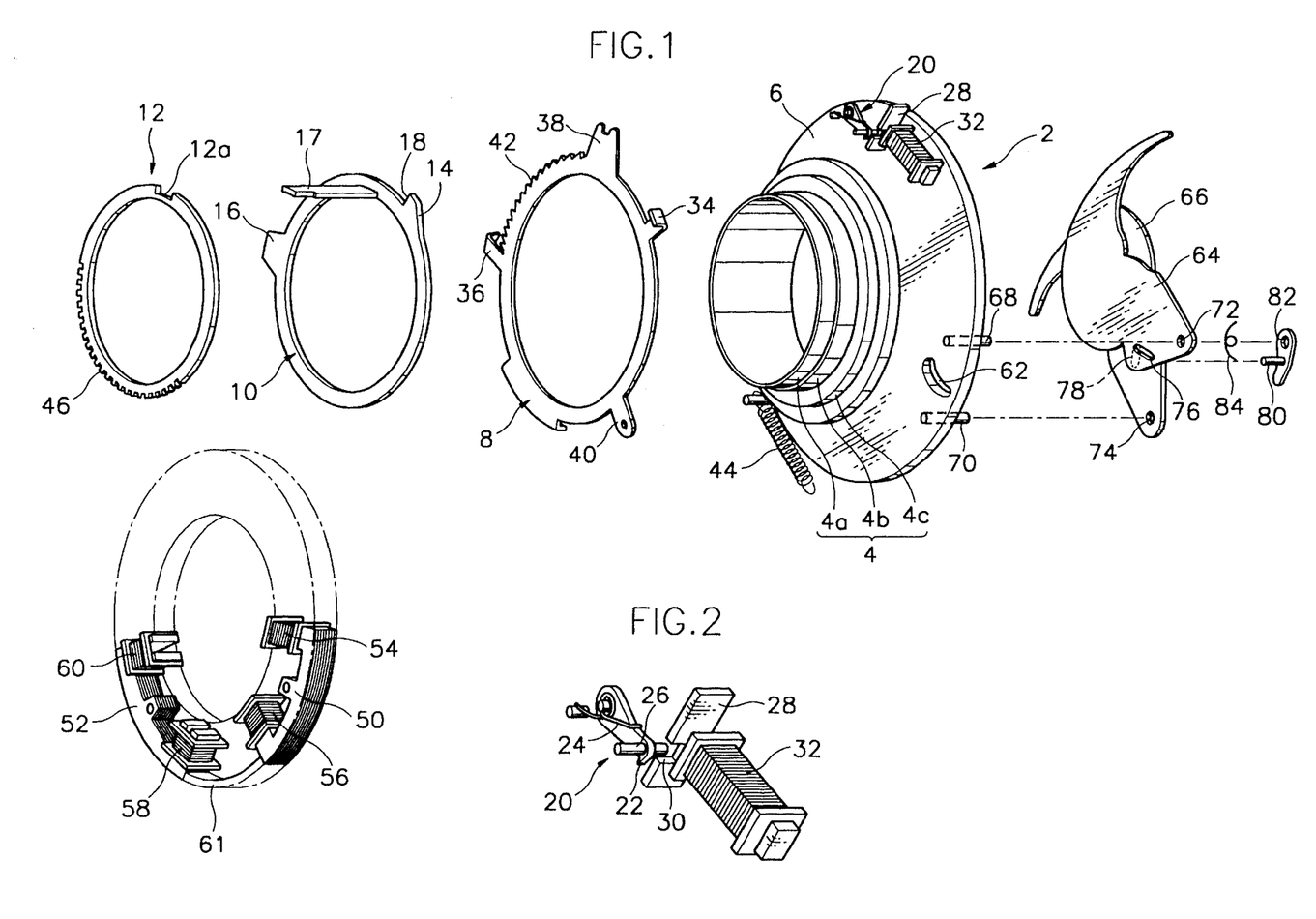
FIG. 1 is an exploded perspective view schematically illustrating a construction of a preferred embodiment of an electromagnetic lens shutter apparatus in accordance with the present invention.
FIG. 2 is an enlarged perspective view illustrating a ratchet operation mechanism shown in FIG. 1 in accordance with the present invention.

Referring to FIG. 1, the electromagnetic lens shutter apparatus has a lens mount 2 which comprises a hollow cylindrical portion 4 having three step diameter portions 4a, 4b and 4c and a flange 6 fixed on one end of the cylindrical portion 4. In addition, a focus adjustment ring 8, an exposure adjustment ring 10 and a rotor 12 are rotatably mounted on the outer circumference of the cylindrical portion 4.

An exposure adjustment cam 14 for adjusting an open amount of a pair of lens shutter blades 64, 66, a lug 18 and a release cam 16 are formed on the outer periphery of the exposure adjustment ring 10 sequentially in a counterclockwise direction.

In accordance with the counterclockwise rotation of the exposure adjustment ring 10, the release cam 16 moves a ratchet 20 which is rotatably mounted on the flange 6 of the lens mount 2. As shown in FIG. 2, the ratchet 20 has a pawl 22 and a pin 26.

The ratchet 20 is pressed by a torsion spring 24 in a predetermined direction. If the exposure adjustment ring 10 is rotated in the counterclockwise direction, the pin 26 is pushed by the release cam 16, and the ratchet 20 is rotated in the counterclockwise direction.

The pin 26 of the ratchet 20 meshes with a notch 30 formed in an engaging member 28 made of magnetic material. The engaging member 28 is slidably mounted on the flange 6 at a predetermined spacing from an electromagnet 32 placed on the flange 6 of the lens mount 2, and the engaging member 28 is attracted to the electromagnet 32 if the electromagnet 32 is excited.

Referring to FIG. 1, a front arm 34, a rear arm 36, a lens interlocking arm 38 and a fixed projection 40 are formed in the outer circumference of the focus adjustment ring 8. A ratchet gear 42 which engages with the pawl 22 of the ratchet 20 is formed in a predetermined portion of the outer circumference of the focus adjustment ring 8 e.g. between the arms 36 and 38. The lens interlocking arm 38, together with a lever 90 (FIG. 11) that will be described later, forms a lens interlocking means.

The ratchet 20, the ratchet gear 42, the torsion spring 24, the engaging member 28 and the electromagnet 32 form a locking means for selectively locking the focus adjustment ring 8 against rotation.

When the focus adjustment ring 8 is mounted on the outer circumference of the diameter portion 4c of the cylindrical portion 4, the front arm 34 contacts the counterclockwise side of the lug 18 of the exposure adjustment ring 10 mounted on the outer circumference of the diameter portion 4b of the cylindrical portion 4.

The fixed projection 40 is connected to one end of a tension spring 44 with the other end thereof on the flange 6 of the lens mount 2. The tension spring 44 acts as a return means to return the focus adjustment ring 8 to an initial position.

The rotor 12 forms a linear pulse motor together with stators 50, 52 that will be described later. If the rotor 12 is installed on the outer circumference of the diameter portion 4a of the cylindrical portion 4, a rod 17 of the exposure adjustment ring 10 engages with a notch 12a of the rotor 12, and accordingly, the exposure adjustment ring 10 rotates in accordance with the rotation of the rotor 12. The number of the rod 17 and the notch 12a can be more than one.

Figure 3:
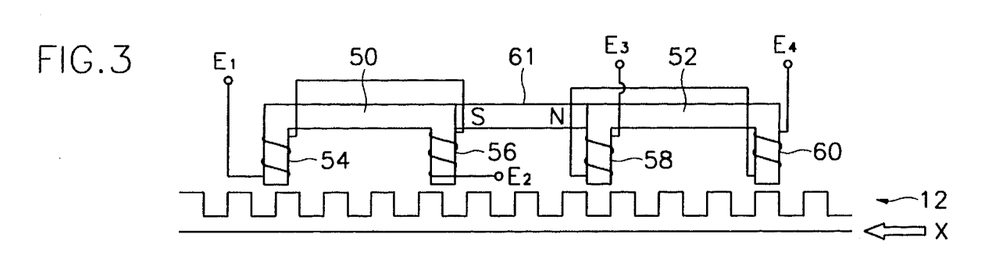
FIG. 3 is an imaginary schematic diagram illustrating the ring-shaped rotor and stator of FIG. 1 placed in a linear manner.

The stators 50, 52 are placed over the outer circumference of the rotor 12 at a predetermined distance from the rotor 12. Actually, the stators 50, 52 are fixed and attached to a camera body separately from the lens mount 2. Each stator 50, 52 is of C-shape and has two armatures 54, 56 and 58, 60, respectively. A permanent magnet 61 is placed between both stators 50, 52. In FIG. 3, to explain the movement of the rotor 12 with respect to the stators 50, 52, the armatures are imaginarily exploded on a plane for ease of illustration. Actually, of course, the armatures 54, 56, 58 and 60 are circularly placed around the rotor 12 as shown in FIG. 1.

Referring to FIG. 3, each armature 54, 56, 58, 60 has the same coil winding direction. Electric current is separately supplied to the armatures 54 and 56 of the stator 50 and to the armatures 58 and 60 of the stator 52.

The interval between two armatures 58, 60 of the stator 52 are set to allow the armatures 58, 60 to be disposed opposite one of the grooves and one of the projections of the rotor 12, respectively. Namely, if the armature 58 is opposite to a groove of the rotor 12, the armature 60 becomes opposite to a projection of the rotor 12. This is also true of the distance between the armatures 54, 56 of the stator 50. The interval between the stators 50, 52 are set to allow, when the armatures 54, 56 (or 58, 60) of one stator 50 (or 52) are confronted with a groove and a projection of the rotor 12 respectively, the armatures 58, 60 (or 54, 56) of another stator 52 (or 50) are confronted with a right half of a projection and a left half of another projection respectively.

Figure 4:
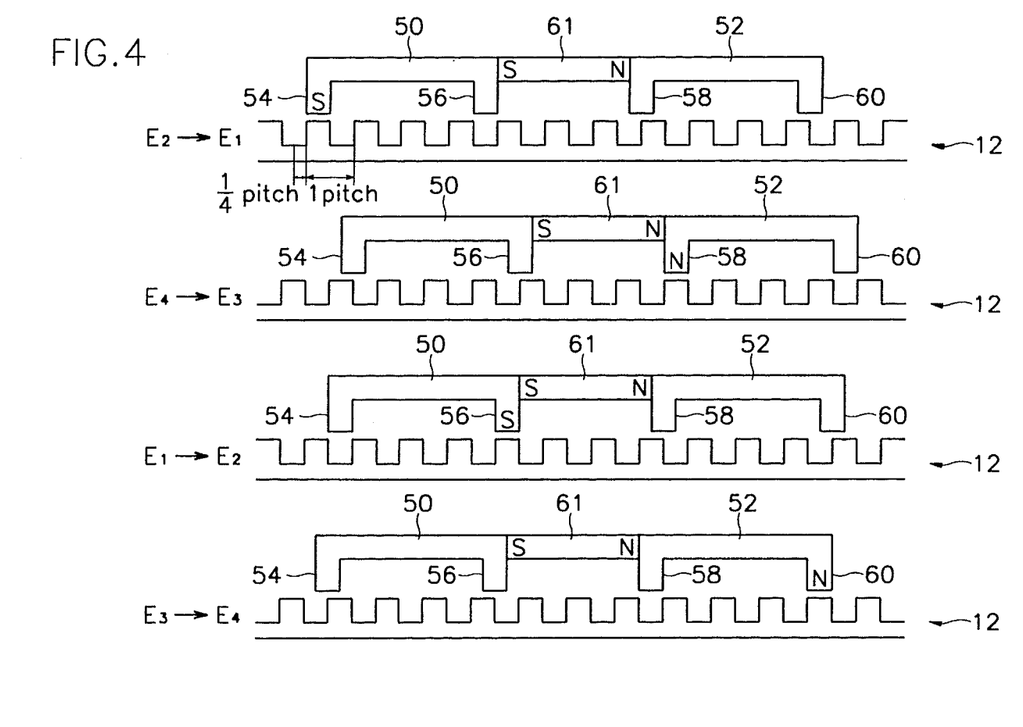
FIG. 4 is a schematic diagram illustrating a motion of the rotor shown in FIG. 1.

FIG. 4 illustrates the operation of the rotor 12 shown in FIG. 3 in four steps. Here, it is assumed that the coil of each armature is wound in the direction shown in FIG. 3.

At the beginning of a first step, the location of the rotor 12 is the same with what is shown in FIG. 3. In the first step, the current flows from an E2 terminal to an E1 terminal only. While the armature 54 turns to a south pole, the north pole of the armature 56 is counterbalanced with the south pole of the magnet 61. Thus the projection of the rotor 12 is pulled by the armature 54 only, and the rotor 12 is moved to the left by a quarter pitch as shown in the top of FIG. 4.

At the beginning of a second step, the location of the rotor 12 is the same with what is shown in the top of FIG. 4. In the second step, the current flows from an E4 terminal to an E3 terminal only. While the armature 60 turns to a south pole, the north pole of the armature 58 is superposed by the north pole of the magnet 61. Thus the armature 58 has a bigger magnetic force than the armature 60, and the rotor 12 is moved to the left by a quarter pitch again as shown in the second of FIG. 4.

In the third step, the current flows from the E1 terminal to the E2 terminal only. And in a fourth step, the current flows from the E3 terminal to the E4 terminal only. The armature 56 pulls the rotor 12 in the third step, and the armature 60 pulls the rotor 12 in the fourth step, the rotor 12 being moved to the left by a quarter pitch at each step.

If one cycle from the first step to the fourth step is completed, the rotor 12 is moved to the left by one pitch. Accordingly, the rotor 12 is rotated in the counterclockwise by one pitch. The rotation of the rotor 12 can be reversed by altering the order and direction of the current flow described in the above.

Figure 5:
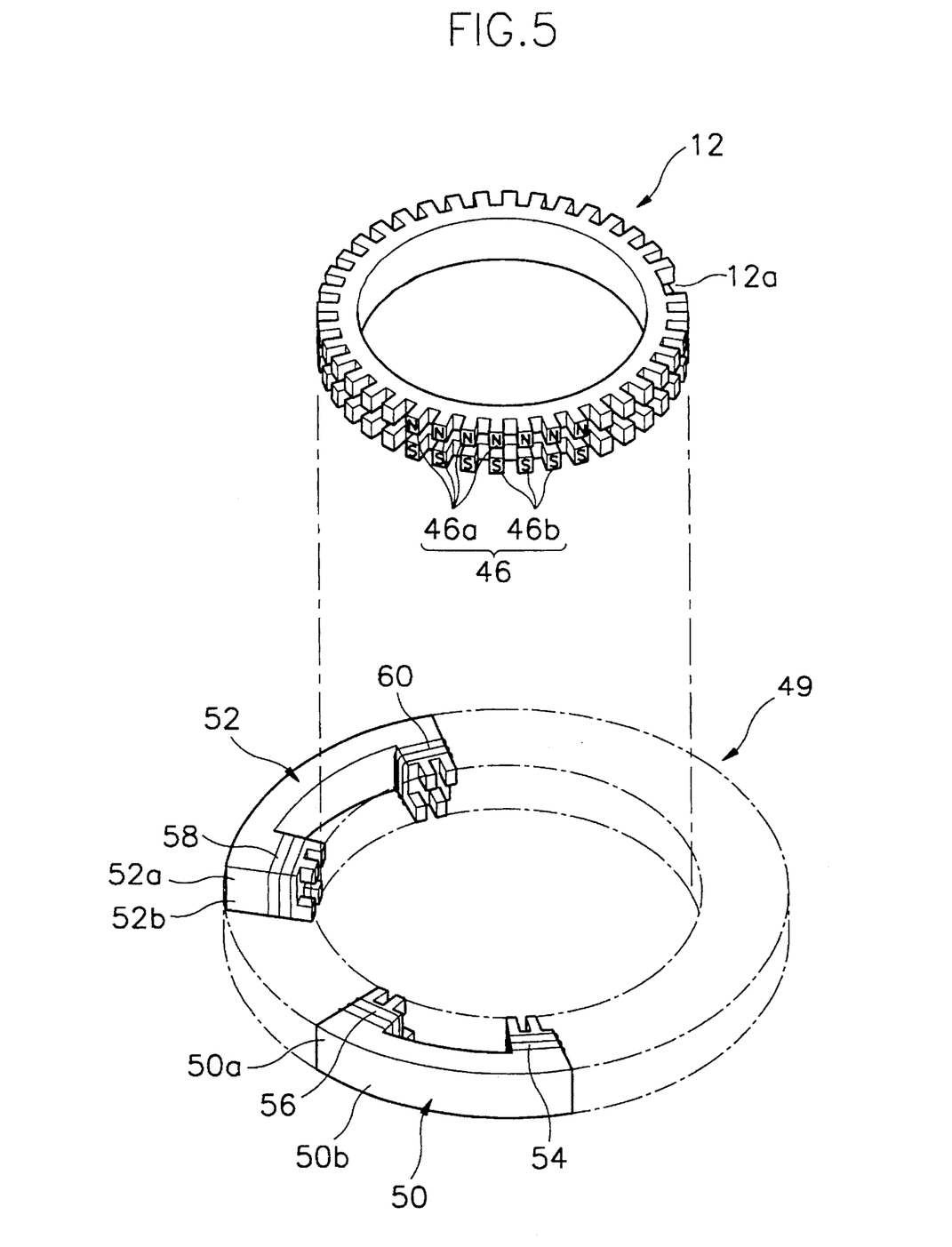
FIG. 5 is a perspective view illustrating a stator and a rotor of another embodiment of the invention in an exploded manner.
Figure 6:
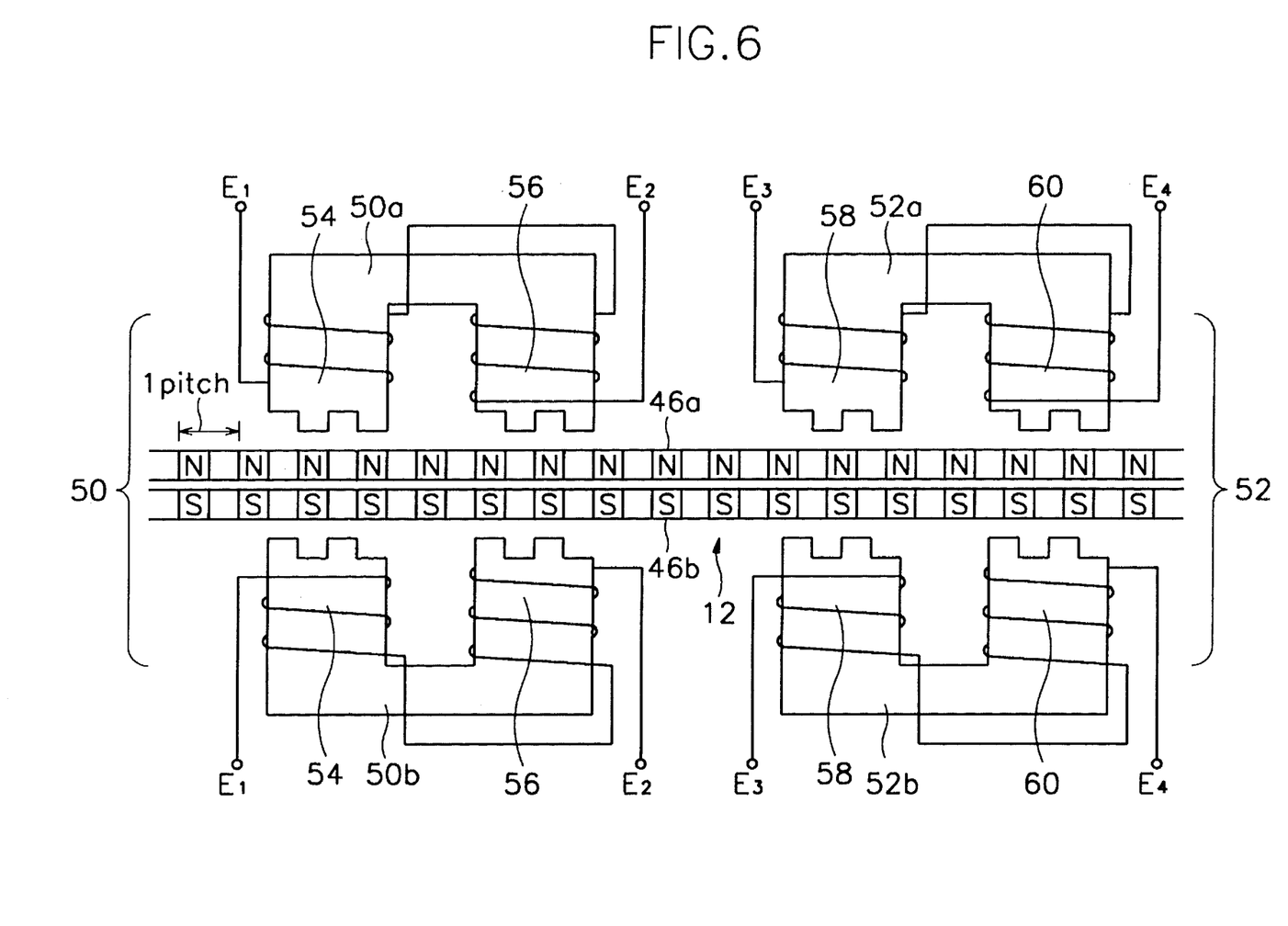
FIG. 6 is an imaginary schematic diagram of the stator and the rotor shown in FIG. 5.

FIGS. 5 and 6 shows a preferred embodiment of a construction different from that of the rotor and the stator shown in FIG. 3. Referring to FIG. 5, the rotor 12 is a permanent magnet divided by an upper part and a lower part. A plurality of north poles 46a in the upper part and a plurality of south poles 46b in the lower part are respectively formed at the outer circumference of the rotor 12 at regular intervals. The end portions of the armatures 54, 56 and 58, 60 are also divided in the upper and lower parts in a manner corresponding to the poles 46 of the rotor 12 to form radially inwardly projecting portions at a regular spacing. The projecting portions in the upper and lower parts are placed to be staggered relative to one another.

In FIG. 6, the upper part of the armatures 54, 56, 58 and 60 are shown above the north poles 46a of the rotor, and the lower part of the armatures 54, 56, 58 and 60 are shown under the south poles 46b of the rotor 12. Actually, the upper and lower parts of the armatures are not separate from each other, but are one body.

Referring to FIG. 6, the projecting portions of the upper part of the armature 54 are opposite the north poles 46a of the rotor 12, and the projecting portions of the lower part of the armature 54 are opposite the intervals between the south poles 46b of the rotor 12. Also, the projecting portions of the upper part of the armature 56 are opposite the intervals between the north poles 46a of the rotor 12, and the projecting portions of the lower part of the armature 56 are opposite the south poles 46b of the rotor 12.

The projecting portions of the upper part of the armature 58 which are opposite the north poles 46a of the rotor 12, are overlapped by a quarter pitch to the left of the north poles 46a, and the projecting portions of the lower part of the armature 58 which are opposite the south poles 46b of the rotor 12 are overlapped by a quarter pitch to the right of the south poles 46b. Also, the projecting portions of the upper part of the armature 60 which are opposite the north poles 46a of the rotor 12 are overlapped by a quarter pitch to the right of north poles 46a, and the projecting portions of the lower part of the armature 60 which are opposite the south poles 46b of the rotor 12 are overlapped by a quarter pitch to the left of the south poles 46b.

Figure 7:
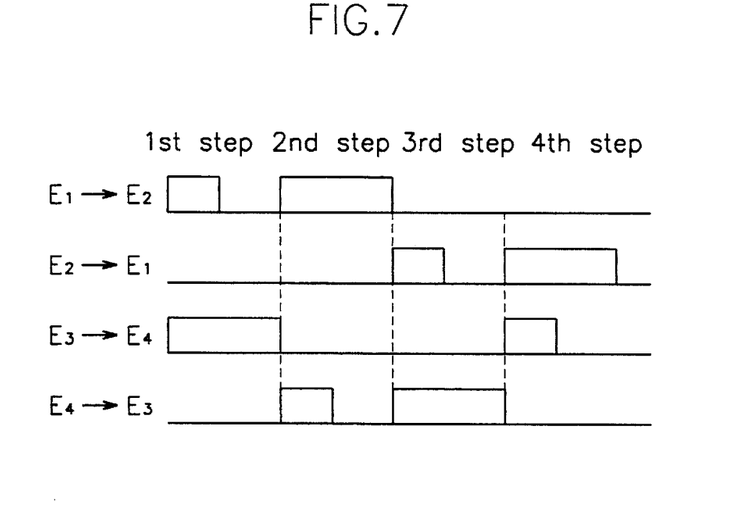
FIG. 7 is a timing chart illustrating electric current flows to the stators shown in FIG. 6.

FIG. 7 shows a timing chart illustrating electric current flows to the stators of FIG. 6.

In the first step, the current flows from the $E_1$ terminal to the $E_2$ terminal, and from the $E_3$ terminal to the $E_4$ terminal. At this point, the projecting portions of the armatures 54, 58 become north poles, and the projecting portions of the armatures 56, 60 turn to south poles. Accordingly, a repulsion is generated between the projecting portions of the upper part of the armature 58 and the north poles 46a of the upper part of the rotor 12 opposite the projecting portions while being partially overlapped, and an attraction is generated between the projecting portions of the lower part of the armature 58 and the south poles 46b of the lower part of the rotor 12. Also, an attraction is generated between the projecting portions of the upper part of the armature 60 and the north poles 46a of the upper part of the rotor 12 opposite the projecting portions which are partially overlapped and a repulsion is generated between the projecting portions of the lower part of the armature 60 and the south poles 46b of the lower part of the rotor 12 opposite the projecting portions which are partially overlapped. Accordingly, as a whole, the rotor 12 is moved to the right by a quarter pitch relative to the stators 50, 52.

As shown in FIG. 7, the pulse of the current from the $E_1$ terminal to the $E_2$ terminal does not reach to all the sections in a first step to prevent an overrunning of the rotor 12. The same may be said of the second to fourth steps.

In a second step, the current flows from the $E_1$ terminal to the $E_2$ terminal, and from the $E_4$ terminal to the $E_3$ terminal. At this time, the projecting portions of the armatures 54, 60 become north poles, and the projecting portions of the armatures 56, 58 turn to south poles. Accordingly, a repulsion is generated between the projecting portions of the upper part of the armature 54 and the north poles 46a of the upper part of the rotor 12 opposite the projecting portions which are partially overlapped, and an attraction is generated between the projecting portions of the lower part of the armature 54 and the south poles 46b of the lower part of the rotor 12 opposite the projecting portions which are partially overlapped. Also, an attraction is generated between the projecting portions of the upper part of the armature 56 and the north poles 46a of the upper part of the rotor 12 opposite the projecting portions which are partially overlapped, and a repulsion is generated between the projecting portions of the lower part of the armature 56 and the south poles 46b of the lower part of the rotor 12 opposite the projecting portions which are partially overlapped. As a result, as a whole, the rotor 12 is moved again to the right by a quarter pitch relative to the stators 50, 52.

In a third step, the current flows from the $E_2$ terminal to the $E_1$ terminal, and from the $E_4$ terminal to the $E_3$ terminal. In a fourth step, the current flows from the $E_2$ terminal to the $E_1$ terminal. A detailed description of the operation in the third and fourth steps is omitted, but the operation principle is substantially the same as that in the first and second steps.

Since the rotor 12 is moved to the right by a quarter pitch at each step relative to the stator 50, 52, the rotor 12 is moved to the right by one pitch during one cycle of passing the first step to the fourth step. (Actually, the rotor is rotated clockwise by one pitch.) The rotor 12 can be rotated in the reverse direction by altering the order and direction of the current flow described above.

Referring again to FIG. 1, a circular slot 62 is formed in the flange 6 of the lens mount 2 approximately radially to the cylindrical portion 4.

Figure 8:
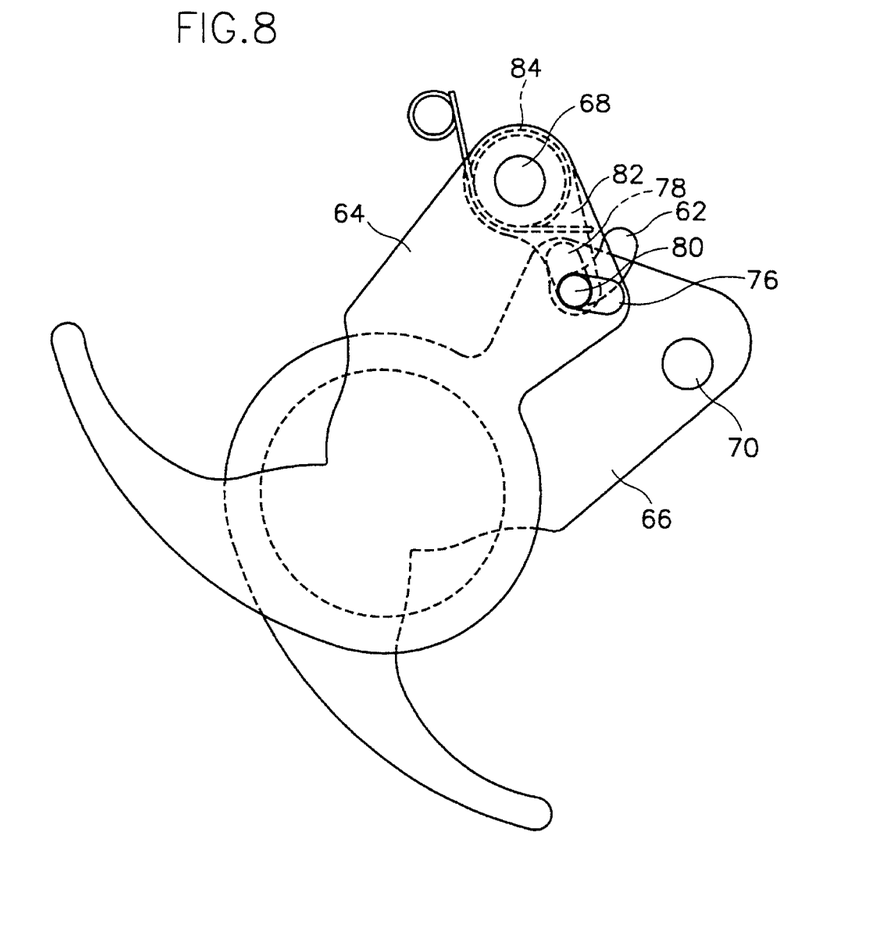
FIG. 8 is a view of the lens shutter blades shown in FIG. 1 in a closed state.
Figure 9:
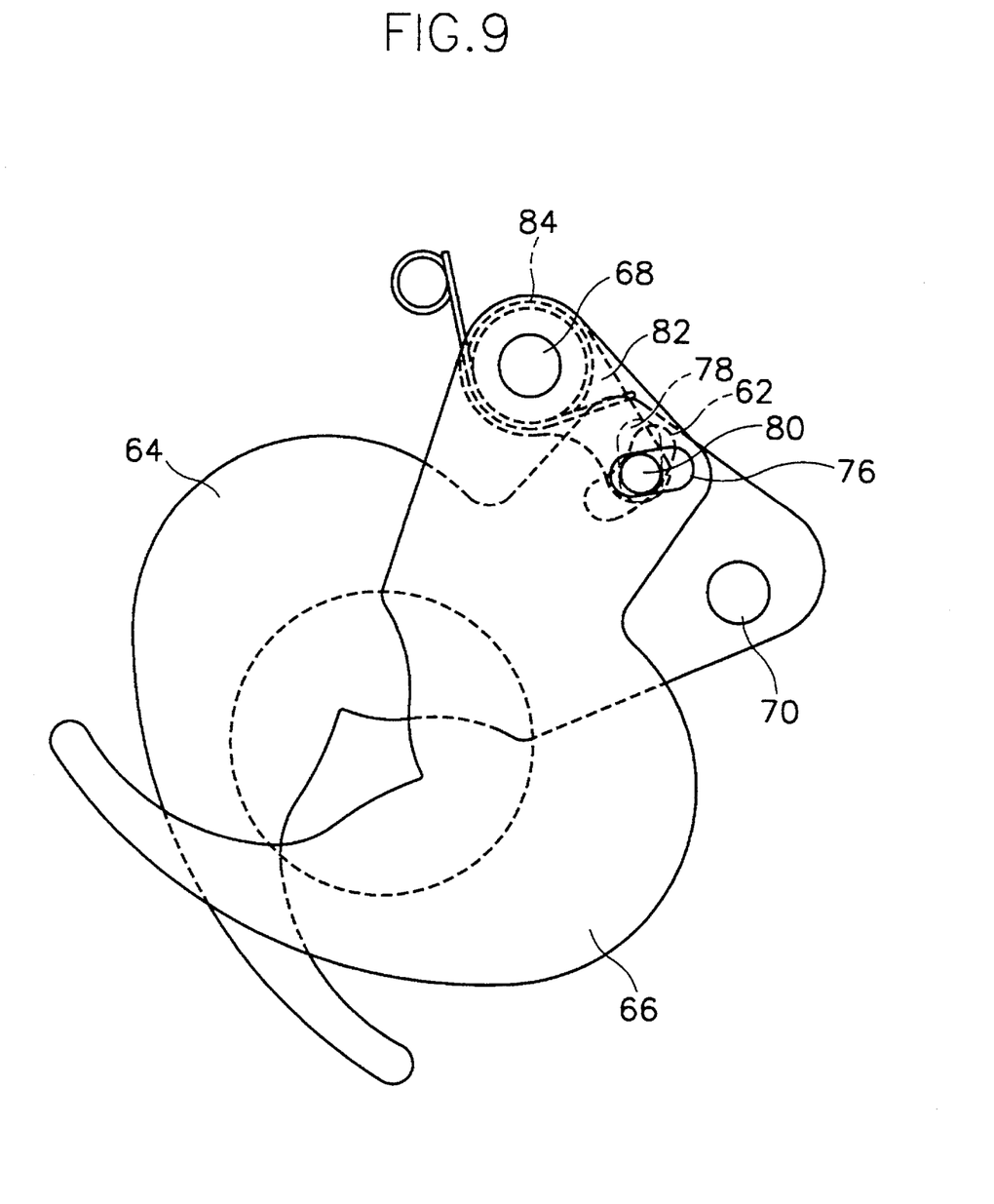
FIG. 9 is a view of the lens shutter blades shown in FIG. 8 in an open state.

A pair of sheet-like lens shutter blades 64, 66 which are mirror-symmetric to each other are rotatably supported on the flange 6 on an opposite side of the cylindrical portion 4. The configurations of these lens shutter blades 64, 66 are shown in FIGS. 8 and 9.

A guide slot 78 and a hinge aperture 74 are formed in the blade 66, and a guide slot 76 and a hinge aperture 72 are formed in the blade 64 mirror symmetric against the guide slot 78 and the hinge aperture 74 in the blade 66.

The blade 64, 66 are rotatably supported on support pins 68, 70 secured in the flange 6 via each hinge aperture 72, 74, respectively.

The support pin 68 passes through the hinge aperture 72 of the blade 64, and also rotatably supports a guide arm 82.

A guide pin 80 slidably mounted within the circular slot 62 is fixed in the guide arm 82. The guide arm 82 is always biased in the clockwise direction by a torsion spring 84. The guide pin 80 passes through the guide slots 76, 78 of the lens shutter blades 64, 66 through the circular slot 62 of the flange 6 and contacts the surface of an exposure adjustment cam 14 in the exposure adjustment ring 10.

The circular slot 62, guide arm 82, torsion spring 84 and side slots 76, 78 form an opening means which open and close the lens shutter blades 64, 66 in accordance with the operation of the exposure adjustment cam 14.

FIGS. 8 and 9 illustrate the closed and open states of the lens shutter blades 64, 66 respectively. If the exposure adjustment ring 10 (FIG. 10) rotates in a clockwise direction, the guide pin 80 is pushed by the exposure adjustment cam 14 along the slot 62 outwardly in a radial direction of the flange 6. Accordingly, as shown in FIG. 9, the lens shutter blades 64, 66 are respectively rotated outwardly of each other, rotating around the support pins 68, 70, and opened.

At this time, the movement distance of the guide pin 80 can be controlled by a rotation angle of the exposure adjustment cam 14, and an open degree of the lens shutter blades 64, 66 can be controlled.

Figure 10:
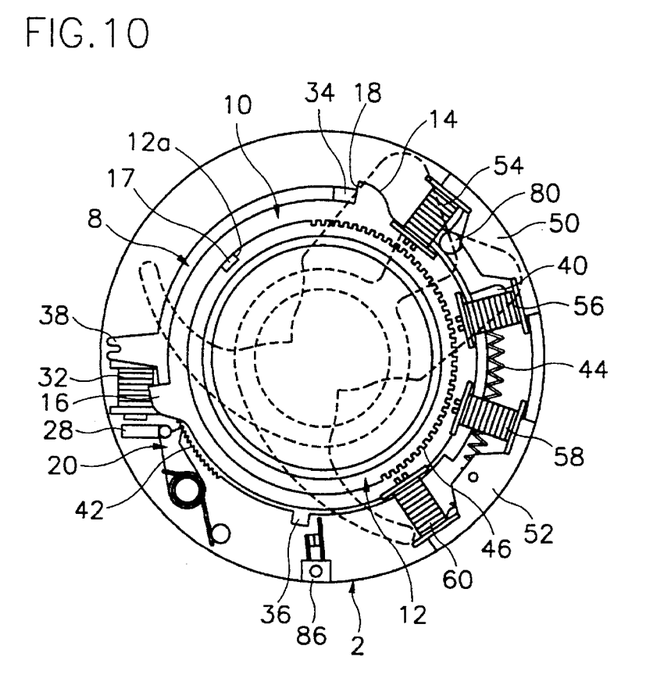
FIG. 10 is a front view of the assembled electromagnetic shutter apparatus shown in FIG. 1.

Referring to FIG. 10, the rotor 12 installed on the outer circumference of the cylindrical portion 4 can be rotated by the armatures 54, 56, 58 and 60. Since the rotor 12 and the exposure adjustment 10 are connected to each other by the rod 17, the exposure adjustment ring 10 is rotated together with the rotor 12. If the exposure adjustment ring 10 is rotated in a counterclockwise direction, since the front arm 34 of the focus adjustment ring 8 is pushed by the lug 18 of the exposure adjustment ring 10, the focus adjustment ring 8 is also rotated in the counterclockwise direction. At the same time, since the release cam 16 of the exposure adjustment ring 10 pushed the pin 26, the ratchet 20 is rotated in a counterclockwise direction and the focus adjustment ring 8 is released. Also, a rear arm 36 of the focus adjustment ring 8 turns OFF a contact switch 86 arranged on the flange 6 of the lens mount 2, and thereby an electric signal is generated. This electric signal is applied to a central processing unit which will be described later.

Figure 11:
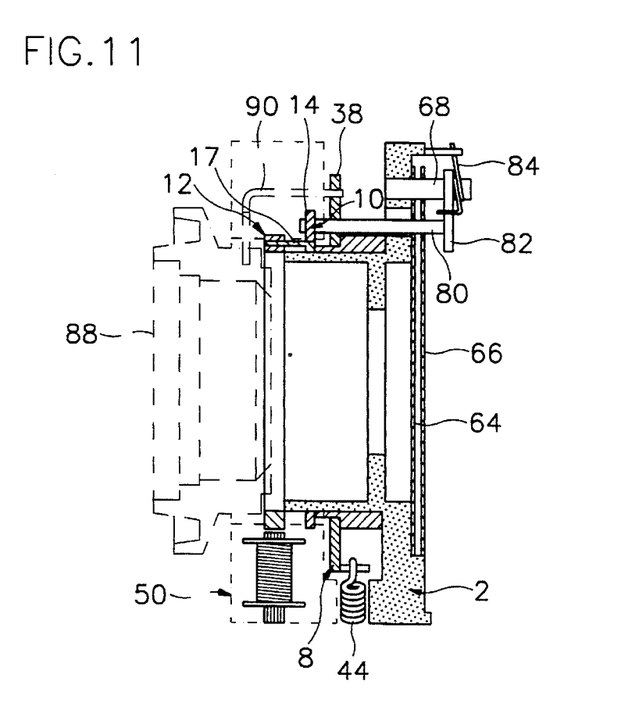
FIG. 11 is a side view of the assembled electromagnetic lens shutter apparatus shown in FIG. 1.

As shown in FIG. 11, a lens barrel 88 is installed in front of the lens mount 2.

A lever 90 is placed in a movable lens part of the lens barrel 88, and the lever 90 is connected to the interlocking part 38 of the focus adjustment ring 8. As shown in FIG. 1, the end portion of the arm 38 can be advantageously formed in a fork shape for easy assembling of the interlocking arm 38 and the lever 90.

Figure 12:
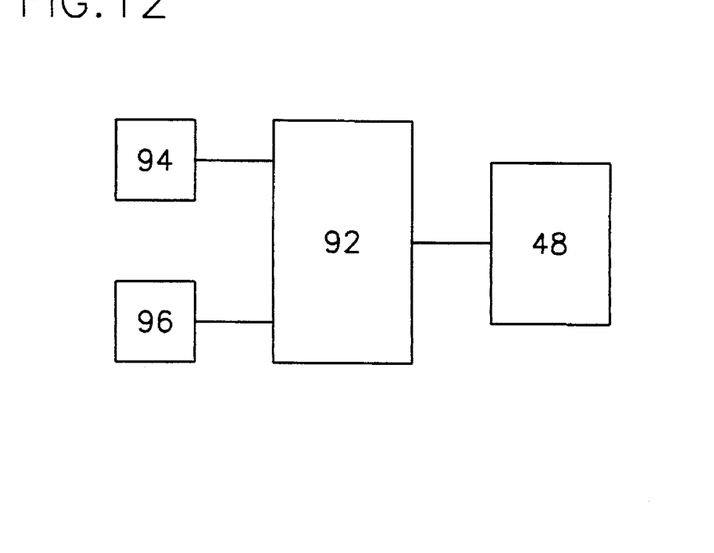
FIG. 12 is a block diagram of a circuit used in an electromagnetic lens shutter apparatus in accordance with an embodiment of the present invention.

The electromagnetic shutter apparatus is controlled by an ordinary electronic control system as shown in FIG. 12. Referring to FIG. 12, current flows to the stator 50, 52 by the operation of a CPU 92 in accordance with the signal input from a light measuring circuit 94 and a distance measuring circuit 96.

Figure 13:
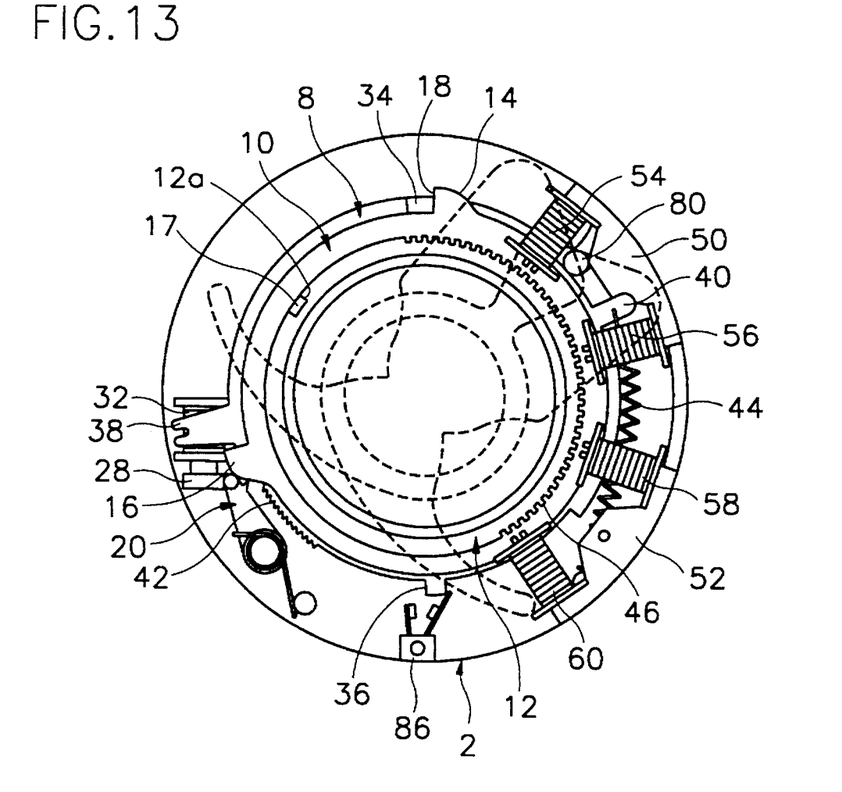
FIG. 13 is a schematic diagram illustrating the focus adjustment ring of FIG. 10 in a released state.

FIG. 10 shows an early operation state of the shutter. If the shutter button (not shown) is pressed, current flows to the stators 50, 52 in accordance with the control signal from the CPU 92. As shown in FIG. 13, the rotor 12 is rotated counterclockwise and the ratchet 20 is rotated to the release position by the release cam 16 of the exposure adjustment ring 10. At this time, the focus adjustment ring 8 is also rotated by being pushed by the lug 18 of the exposure adjustment ring 10 and thereby the contact switch 86 is turned OFF. In accordance with this operation, the operation start signal is input to the CPU 92.

The CPU 92 which received the operation start signal excites the electromagnet 32 and thereby the engaging member 28 is pulled to the electromagnet 32 so that the ratchet 20 is held in the release position. The CPU 92 outputs a rotation signal corresponding to a distance value measured by the distance measuring circuit 96 to the stators 50, 52. As a result, the rotor 12 is rotated at an angle corresponding to said distance value. At this point, the focus adjustment ring 8 is also rotated by the torsion spring 44 clockwise.

Figure 14:
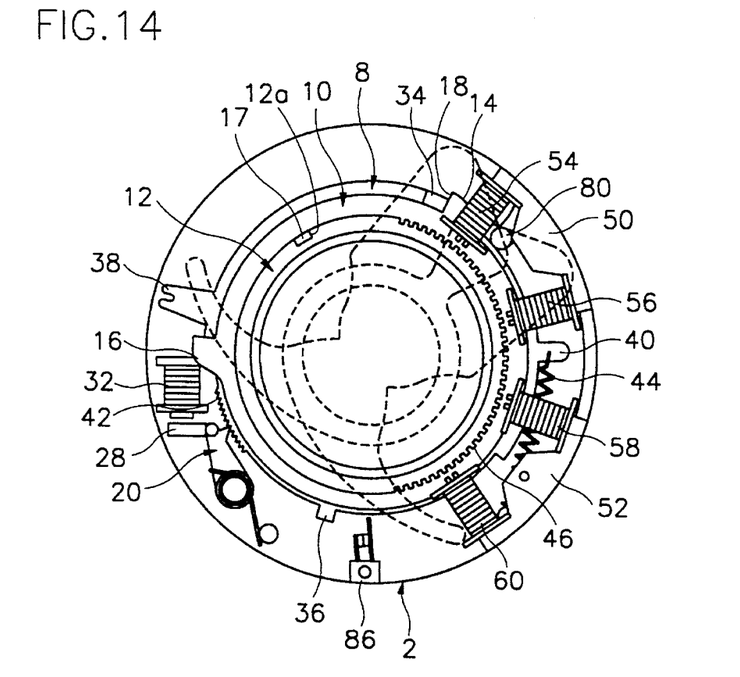
FIG. 14 is a schematic diagram illustrating the focus adjustment ring in a state to control the focus.

If the rotation operation of the rotor 12 stops at an the angle corresponding to the above-mentioned distance value, the CPU 92 demagnetizes the electromagnet 32. Thus, the ratchet 20 is biased by the torsion spring 24, and the pawl 22 is engaged with the ratchet gear 42 of the focus adjustment ring 8 as shown in FIG. 14.

While the focus adjustment ring 8 is rotated by a spring 44 clockwise, the lever 90 rotating together with the lens interlocking arm 38 rotates the movable part of the lens barrel 88, and thereby the focus control is carried out. And in accordance with the control of the CPU 92, current flows to the stators 50, 52 for the rotor 12 to be further rotated clockwise by an angle corresponding to the measured value from the light measuring circuit 94.

Figure 15:
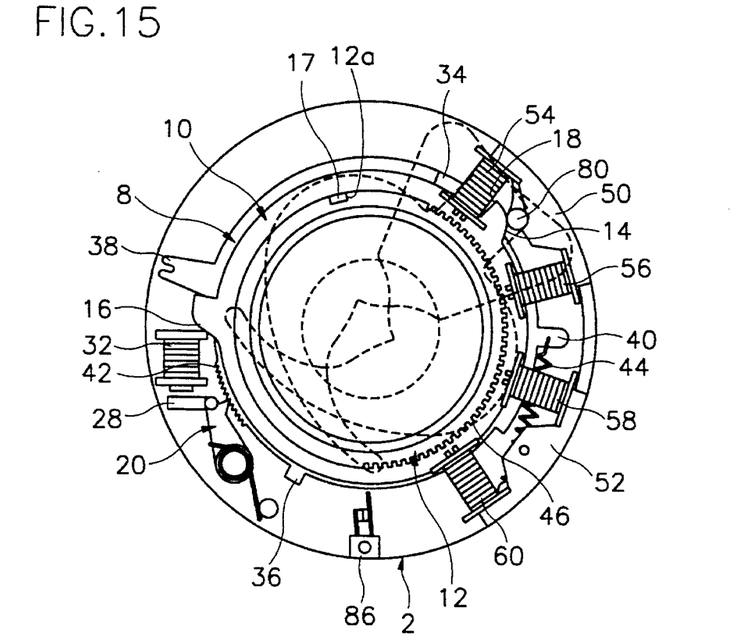
FIG. 15 is a schematic diagram illustrating the opening of the lens shutter by the rotation of the exposure adjustment ring in accordance with the invention.

Accordingly, as shown in FIG. 15, the exposure adjustment cam 14 of the exposure adjustment ring 10 pushes the guide pin 80 and opens the lens shutter blades 64, 66.

As described, the open degree of the lens shutter blades 64, 66 is decided by the movement distance of the guide pin 80 being rotated by the exposure adjustment cam 14. Also, an open time period is determined by the time taken by the exposure adjustment ring 10 in rotating counterclockwise via an inverting signal of the CPU 92 in order to return the guide pin 80 to the initial position. If the exposure adjustment ring 10 is rotated counterclockwise in accordance with the inverting signal and returns to the state shown in FIG. 10, one cycle of the lens shutter is completed.

The invention thus provides an electromagnetic lens shutter apparatus of simple construction. In particular, since the electromagnetic lens shutter apparatus can be applied to a camera having an automatic exposure and focus control function or an automatic exposure control function, the electromagnetic shutter apparatus can be applied to a so-called auto zoom camera in which a focus distance has to be automatically focused.

What is claimed is:

1. An electromagnetic lens shutter apparatus comprising a lens mount including a hollow cylindrical portion defining an opening and a flange fixed on said cylindrical portion;

at least two sheet-like lens shutter blades rotatably mounted on said flange on a side opposite said cylindrical portion;

an exposure adjustment ring rotatably mounted on said cylindrical portion and including an exposure adjustment cam;

a linear pulse motor for driving said exposure adjustment ring, said linear pulse motor including a circular rotor rotatably mounted around said cylindrical portion and a plurality of stators placed around said rotor, said rotor having a plurality of projections projected radially outwardly at regular intervals with each projection divided into an upper part with a north pole and a lower part with a south pole, and each stator having a pair of armatures with an end portion of each armature formed with a plurality of projecting portions confronted with said poles of said rotor respectively;

opening means for opening and closing said shutter blades in accordance with the operation of said exposure adjustment cam; and a central processing unit to control the rotation of the linear pulse motor.

2. An electromagnetic lens shutter apparatus for a camera as set forth in claim 1 wherein each said armature has a pair of projecting portions at an upper part and a pair of projecting portions at a lower part thereof with said projecting portions of the upper parts and lower part staggered relative to each other.

3. An electromagnetic lens shutter apparatus for a camera as set forth in claim 1 further comprising a focus adjustment ring including a lens interlocking means and rotatably mounted around said cylindrical portion, said focus adjustment ring being rotated to one direction by said exposure adjustment ring and to the opposite direction by a return means; and a locking means for selectively locking said focus adjustment ring in accordance with the operation of said exposure adjustment ring.

4. An electromagnetic lens shutter apparatus for a camera as set forth in claim 3 further comprising a contact switch to generate an electronic start signal to be input to said central processing unit in accordance with the operation of said focus adjustment ring.

* * * * *